J. SCHURCH.
POWER TRANSMISSION SYSTEM.
APPLICATION FILED JAN. 12, 1916.

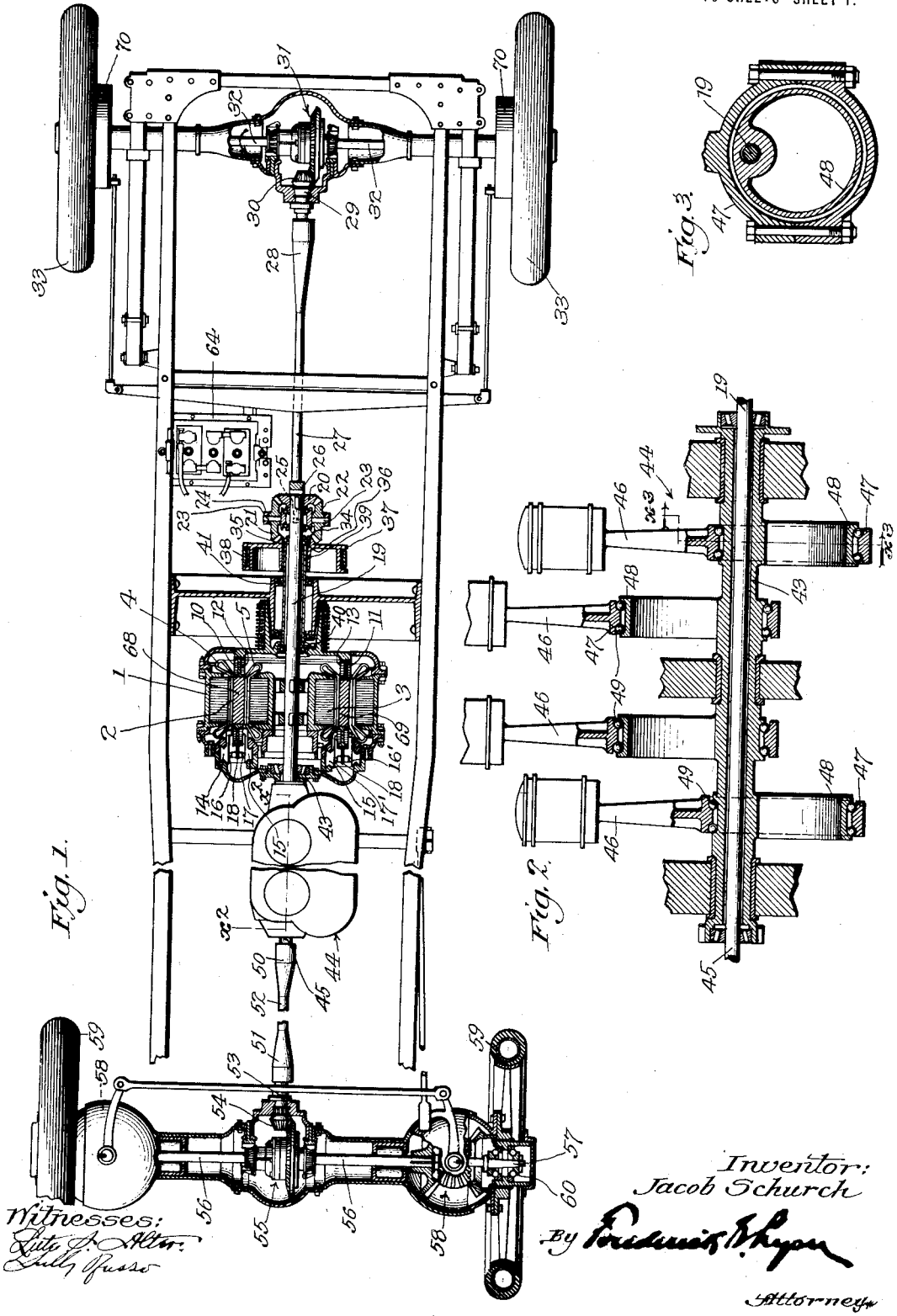
J. SCHURCH.
POWER TRANSMISSION SYSTEM.
APPLICATION FILED JAN. 12, 1916.
1,350,424.
Patented Aug. 24, 1920.
10 SHEETS—SHEET 1.
Inventor:
Jacob Schurch

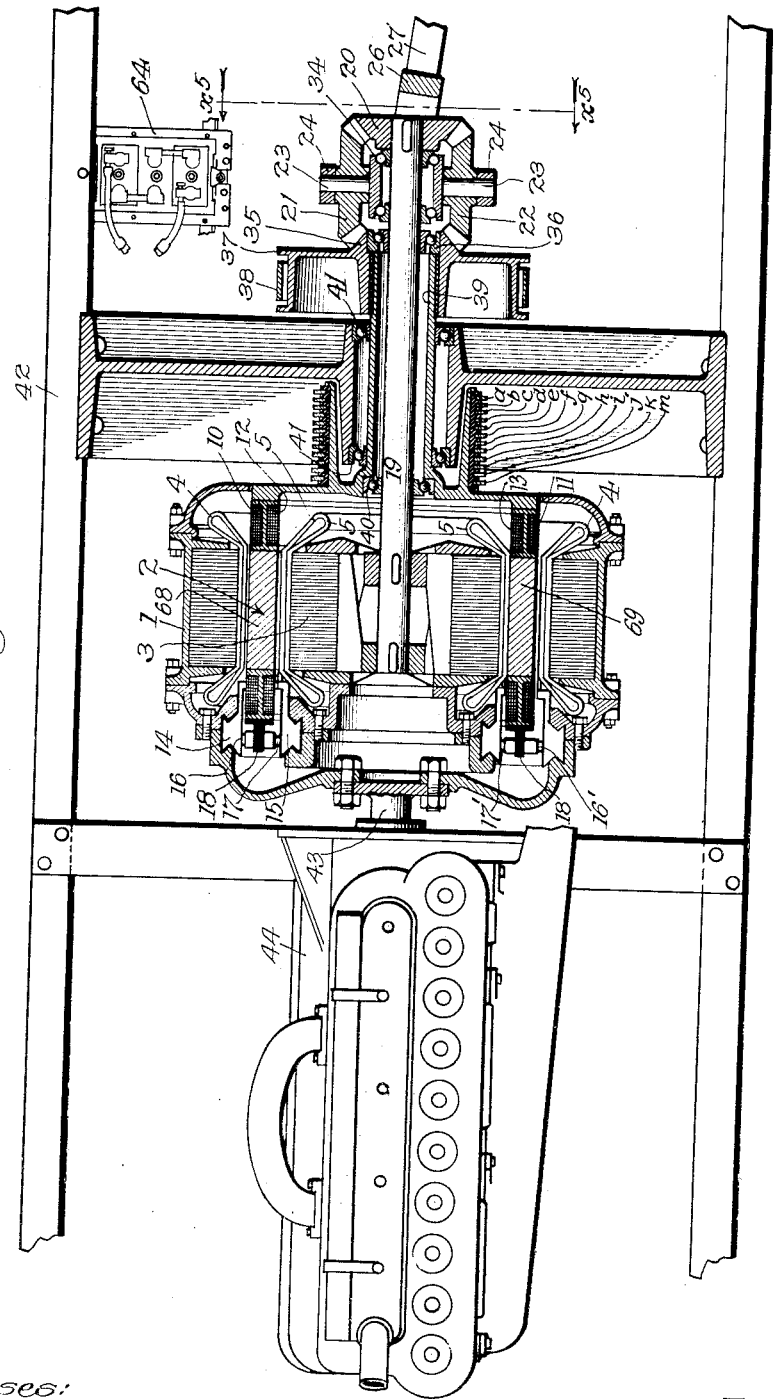

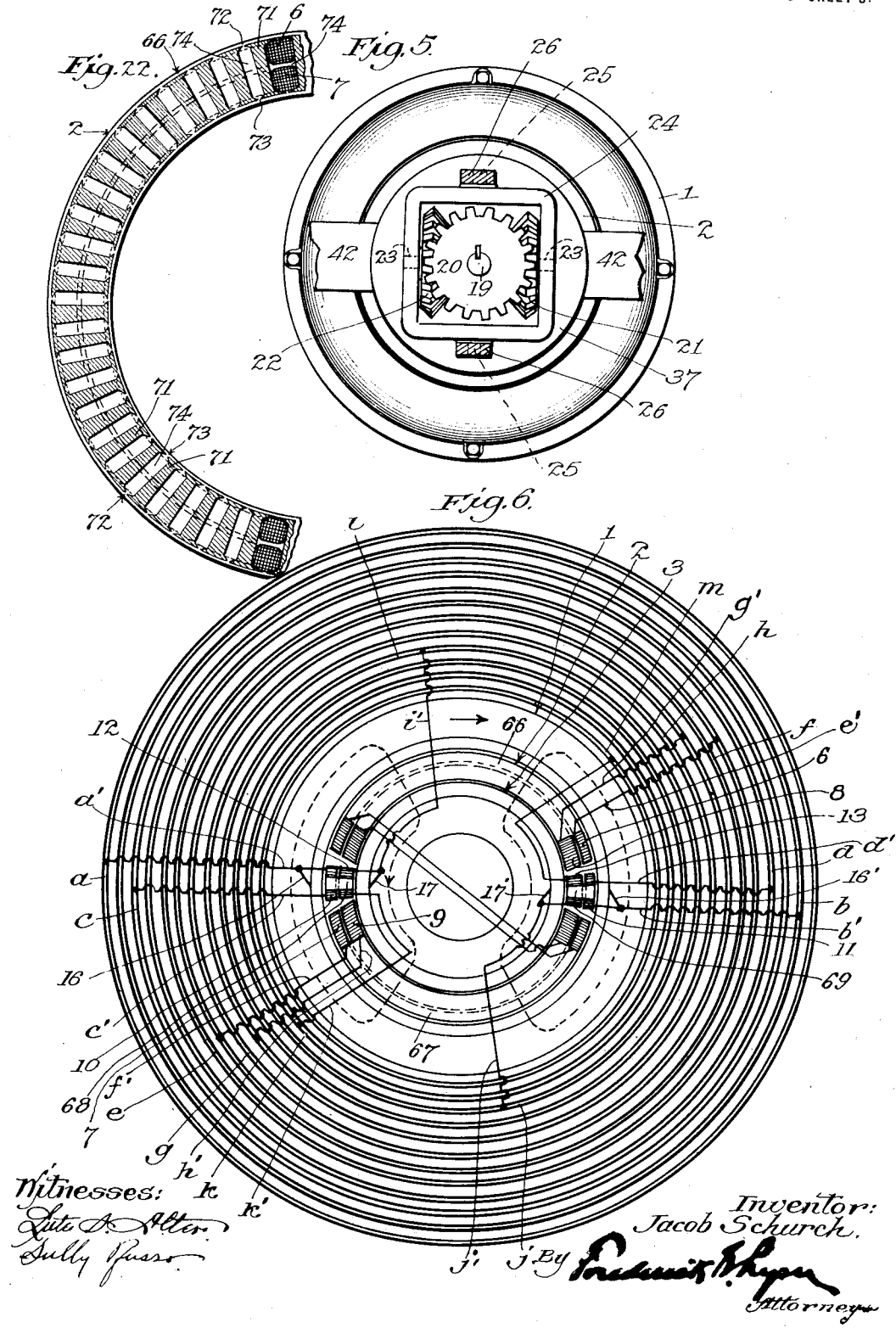

1,350,424.

Patented Aug. 24, 1920.
10 SHEETS—SHEET 4.

Witnesses:

Inventor:
Jacob Schurch
By Frederick W. Ryan
Attorney

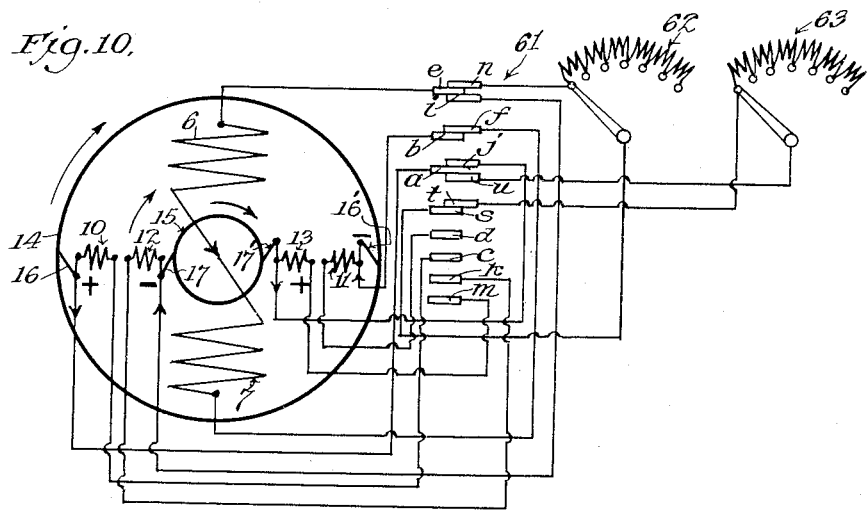
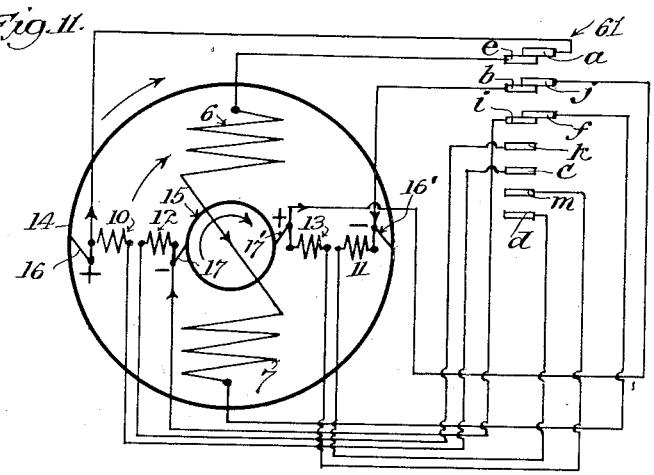
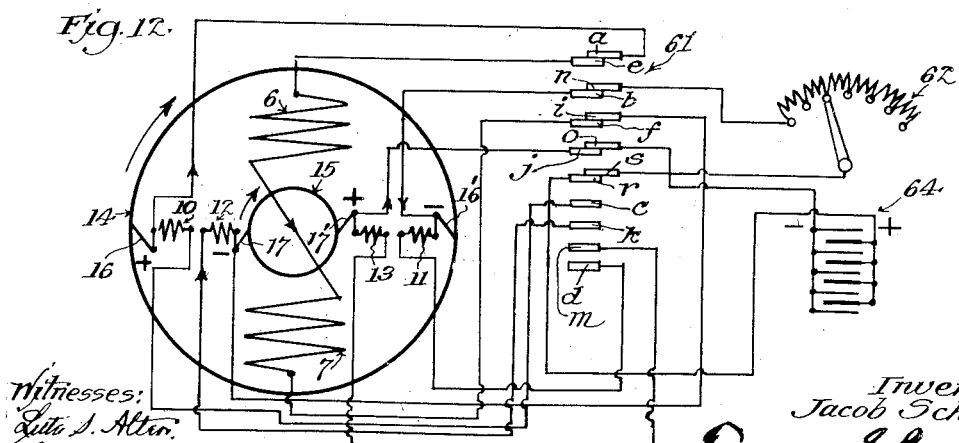

J. SCHURCH.
POWER TRANSMISSION SYSTEM.
APPLICATION FILED JAN. 12, 1916.

1,350,424.

Patented Aug. 24, 1920.
10 SHEETS—SHEET 6.

Witnesses:

Inventor:
Jacob Schurch
By Frederick Whyer
Attorneys

J. SCHURCH.
POWER TRANSMISSION SYSTEM.
APPLICATION FILED JAN. 12, 1916.

1,350,424.

Patented Aug. 24, 1920.
10 SHEETS—SHEET 7.

Witnesses:

Inventor:
Jacob Schurch
By Frederick P. Lyon
Attorneys

J. SCHURCH.
POWER TRANSMISSION SYSTEM.
APPLICATION FILED JAN. 12, 1916.

1,350,424.

Patented Aug. 24, 1920.
10 SHEETS—SHEET 8.

Witnesses:

Inventor:
Jacob Schurch
By Frederick W. Lyon
Attorneys

J. SCHURCH.
POWER TRANSMISSION SYSTEM.
APPLICATION FILED JAN. 12, 1916.

1,350,424.

Patented Aug. 24, 1920.
10 SHEETS—SHEET 9.

Witnesses:

Inventor:
Jacob Schurch,
By Frederick W. Ryan
Attorney

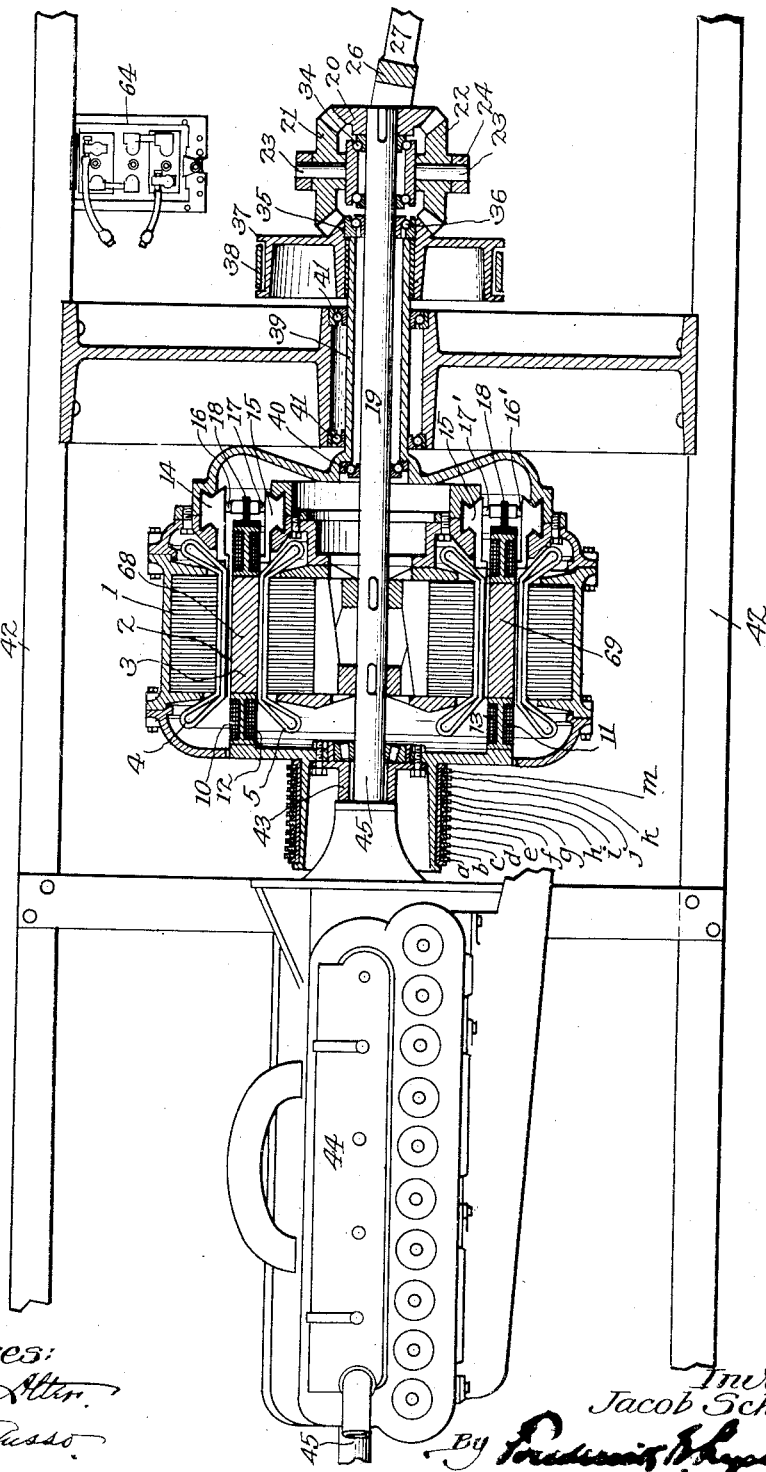

UNITED STATES PATENT OFFICE.

JACOB SCHURCH, OF HOLTVILLE, CALIFORNIA, ASSIGNOR TO IMPERIAL ELECTRIC COMPANY, OF HOLTVILLE, CALIFORNIA, A CORPORATION OF CALIFORNIA.

POWER-TRANSMISSION SYSTEM.

1,350,424.  Specification of Letters Patent.  Patented Aug. 24, 1920.

Application filed January 12, 1916. Serial No. 71,648.

*To all whom it may concern:*

Be it known that I, JACOB SCHURCH, having declared my intention of becoming a citizen of the United States, residing at Holtville, in the county of Imperial and State of California, have invented a new and useful Power-Transmission System, of which the following is a specification.

This invention relates to the transmission of power from a prime mover to a driven member and to change of speed of the driven member relative to a constant or varying speed of the prime mover.

In general, an object of the invention is to provide for maximum flexibility of control of the speed of the driven member.

Another object is to effect in some instances reversal of the driven member without using current from an external source.

Another object is to effect in another instance reversal of the driven member by using current from an external source.

Another object is to make provision in another instance for driving both front and rear axles.

Another object is to effect speed regulation without loss of power or lowering the efficiency.

Another object is to maximize the effective torque.

Another object is to make provision for obtaining higher rotative speed of the driven member than the rotative speed of the shaft of the prime mover.

Another object is to make provision for obtaining higher rotative speed and power of the driven member than the rotative speed and power of the shaft of the prime mover.

Another object is to maximize the braking effect.

Another object is to effect the foregoing by a construction of minimum weight and occupying minimum space.

Other objects and advantages may be disclosed hereinafter.

The accompanying drawings illustrate the invention:

Figure 1 is a plan view of the invention embodied in a front and rear drive vehicle one of the front wheels being in section and portions of the vehicle frame, axle housings and other front wheel being broken away and the electrical transmission device being in mid-section.

Fig. 2 is a fragmental sectional elevation on line indicated by $x^2$—$x^2$, Fig. 1, two entire pistons and portions of two other pistons being shown in elevation.

Fig. 3 is a transverse sectional elevation on line indicated by $x^3$—$x^3$, Fig. 2.

Fig. 4 is a plan view partly in section of a different form of the invention embodied in a rear drive vehicle, the wheels being omitted and portions of the frame being broken away to contract the view.

Fig. 5 is an end elevation from line indicated by $x^5$—$x^5$, Fig. 4.

Fig. 6 is a diagram of internal electrical connections of the electrical transmission device.

Fig. 10 is a diagram of electrical connections and circuits whereby the electrical transmission device may operate the driven member at approximately engine speed, all of the rotors turning.

Fig. 11 is a diagram of electrical connections and circuits whereby when the engine is operating to drive the electrical transmission device said device may operate the driven member at greater speed than engine speed, and when the engine is being driven by said device said engine will produce a braking effect, all of the rotors turning.

Fig. 12 is a diagram of electrical connections and circuits whereby the electrical transmission device may operate the driven member at greater speed than the engine speed and with greater power than the engine power, all of the rotors turning excepting the field rotor which is stationary.

Figure 18:
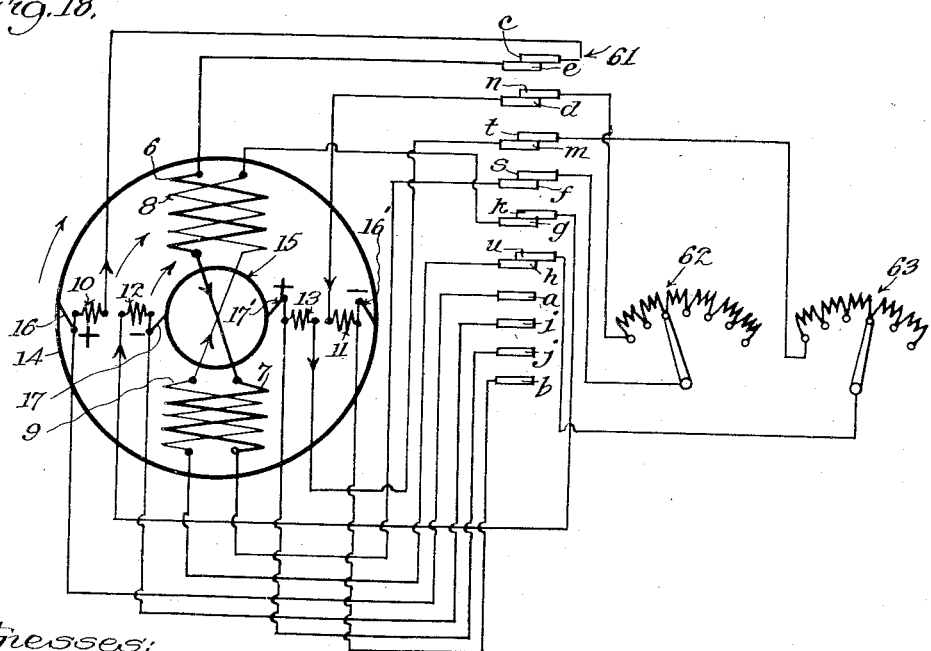

Fig. 18 is a diagram of electrical connections and circuits whereby compounding of the fields is effected to lessen the field strength, the M. M. F. of one field coil being opposed by the M. M. F. of the other field coil, and all of the rotors turning.

Figure 19:
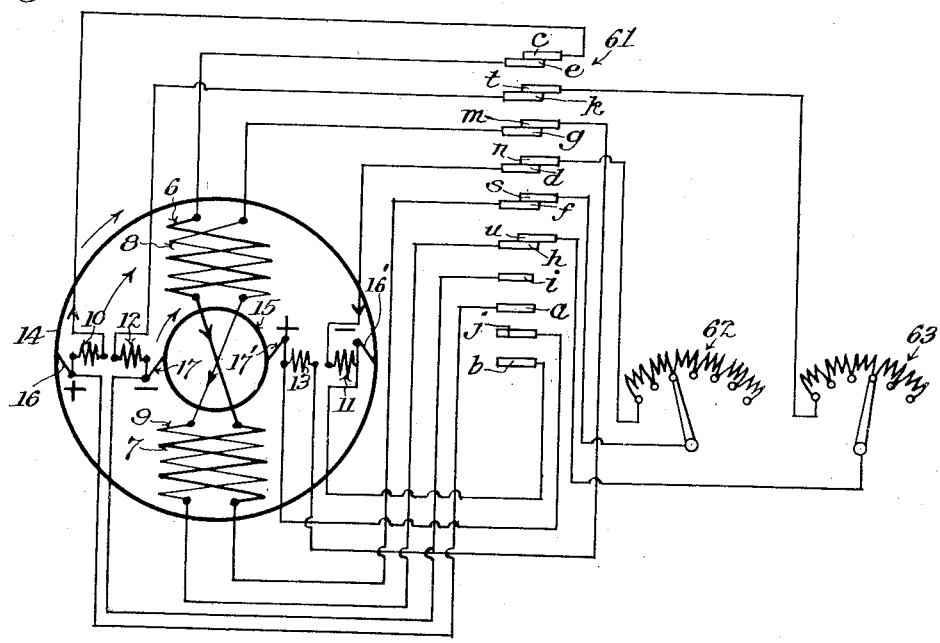

Fig. 19 is a diagram of electrical connections and circuits whereby compounding of the field is effected to increase the field strength, the M. M. F. of one field coil being added to the M. M. F. of the other field coil, and all of the rotors turning.

Figure 20:
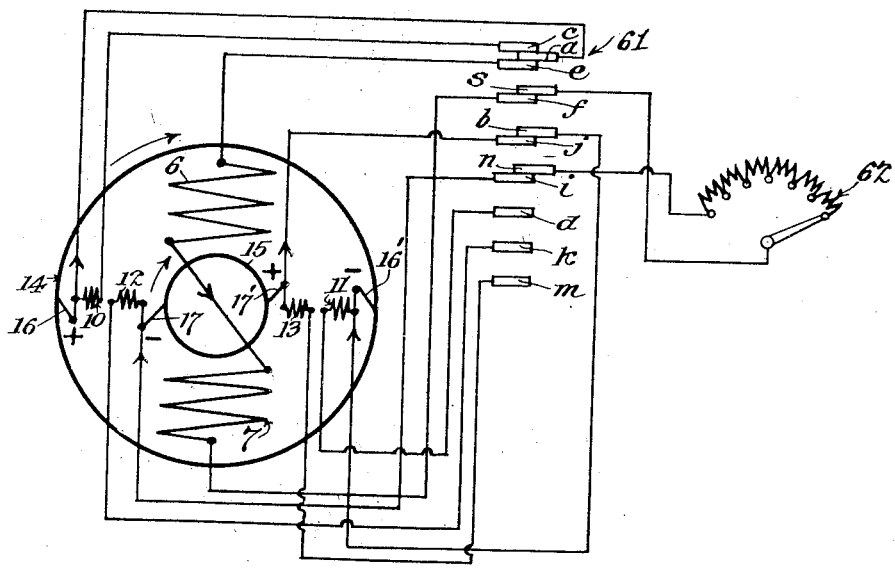

Fig. 20 is a diagram of electrical connections and circuits whereby forward rotation of the driven member is obtained when the field rotor is stationary and the other rotors are turning.

Fig. 21 is a plan view partly in section of a different form of the invention than shown in Figs. 1 and 4, the wheels being omitted and portions of the frame being broken away to contract the view.

Fig. 22 is an enlarged fragmental sectional detail of the field rotor.

There are provided concentric outer, intermediate and inner rotors 1, 2, 3, the outer and inner rotors 1, 3 having suitable windings 4, 5 respectively and constituting rotative armatures and the intermediate rotor 2 being provided, as clearly shown in Fig. 6, with main coils 6, 7, supplemental coils 8, 9 and commutating coils 10, 11, 12, 13, said intermediate rotor constituting a rotative field. The outer and inner rotors 1, 3 are provided with outer and inner commutators 14, 15 respectively engaged by outer and inner brushes 16, 16' and 17, 17' respectively mounted in brush holders 18 which are connected to and are rotative with the field rotor 2. The winding of the armatures may be of any suitable form and the invention is not limited to any particular form of winding.

In the modifications shown in Figs. 1 and 4 the field rotor 2 and inner armature rotor 3 are differentially connected to one another and in the modification shown in Fig. 21, the outer and inner armature rotors are differentially connected to one another, and for this purpose said inner armature rotor is mounted on a shaft 19 provided with a gear wheel 20 meshing with gear wheels 21, 22 which are rotatively mounted on studs 23 projecting inward from and carried by a collar 24 that is pivotally connected by pins 25 and yoke 26 to a driven member in the form of a shaft 27, the gear wheels 20, 21, studs 23, ring 24, pins 25 and yoke 26, all together forming a universal joint for connecting the shaft 19 to the shaft 27. The shaft 27, see Fig. 1, is connected by a universal joint 28 to a shaft 29 having a gear 30 meshing with differential gearing 31 which is connected to axle sections 32 forming one of the axles of the vehicle. Each of the axle sections 32 is provided with a traction wheel 33.

The studs 23 are rotatively mounted by anti-friction bearings 34 on the shaft 19 and the gear wheels 21, 22 mesh with a fourth gear wheel 35 which is rotatively mounted by an anti-friction bearing 36 on the shaft 19. The gear wheel 35 may be held against rotation when desired by a brake drum 37 which is provided with a brake band 38 and which may be formed integral with the gear 35 or connected thereto in any desired manner. The brake band 38 may be contracted and expanded around the drum 37 by any suitable means, not shown, such means being well known in the art and therefore not necessary to show and describe in detail herein.

The gear wheel 35 and brake drum 37 are mounted on a tubular shaft 39 surrounding the shaft 19 and concentric therewith, the forward end of said tubular shaft being journaled by an anti-friction bearing 40 on the shaft 19 and being connected to the field rotor 2 as in Figs. 1 and 4 or to the outer armature rotor 1 as in Fig. 21. The tubular shaft 39 is rotatively mounted externally by anti-friction bearings 41 on a suitable support such as, for instance, a vehicle frame or chassis 42.

From the foregoing it is seen that the inner armature rotor 3 and the field rotor 2 or outer armature rotor 1, as the case may be, may turn at the same speed as one another or relative to one another at different speeds and that regardless of the relative speeds the shaft 27 will transmit power to drive the wheels 33 or, as in coasting, will transmit power from the wheels 33 to the inner armature rotor and field rotor or outer armature rotor, as the case may be.

The field rotor 2 is provided with any suitable number of collector rings, there being shown in this instance twelve rings $a, b, c, d, e, f, g, h, i, j, k, m$ which are rotative with the field.

The armature rotor 1 as in Figs. 1 and 4, and the field rotor 2 as in Fig. 21, are connected to the shaft 43 of a prime mover 44, such as a gas engine or the like, mounted on the vehicle frame 42. The shaft 43 may be tubular as clearly shown in Fig. 2.

The foregoing described construction is the same for the forms of the invention shown in Figs. 1, 4 and 21 and the construction in the forms in Figs. 1 and 21 differentiating from that in Fig. 4 will now be described.

The shaft 43, as shown in Fig. 2, surrounds and is concentric with a forward extension 45 of the armature shaft 19. The connections between the shaft 19 and prime mover 44, in this instance, are constructed as follows: Each of the pitmen 46 of the prime mover is provided with a collar 47 working on an eccentric 48 on the shaft 43, there being anti-friction bearings 49 between the collars and eccentrics. Thus the prime mover 44 when exerting power will drive the armature rotor 1, as in Fig. 1 or will drive the field rotor 2 as in Fig. 21, or, if the power is off, driving of the armature rotor 1 or field rotor, as the case may be, will operate the prime mover.

The inner shaft 19, as shown clearly in Fig. 1, is connected by universal joints 50, 51 and a shaft 52 to a shaft 53 which is connected by a gear wheel 54 and differential gearing 55 to the vehicle front axle that is formed by rotative intermediate sections 56 and non-rotative end sections 57. The intermediate axle sections 56 are connected by suitable gearing 58 to vehicle traction wheels 59 which are rotatively mounted at 60 on the axle end sections 57. From the nature of the views only one each of the end sections 57, gearings 58 and bearings 60 are visible. The gearing 58 may be of any suitable construction capable of effecting the driving of the wheels 59 and, in the instance shown in the drawings, said gearing is of the same construction as that disclosed in my co-pending application for patent for automobile and therefore unnecessary to describe in detail herein.

From the foregoing it is seen that driving of the inner armature rotor 3 will cause rotation of the vehicle wheels 59 or, vice versa, turning of the front wheels 59 will produce turning of said inner armature rotor.

As shown in Fig. 6 the coils 6 to 13 inclusive are electrically connected to the collector rings $e, f, g, h, c, d, k, m$ respectively and the coils 10, 11, 12, 13 are electrically connected to the brushes 16, 16', 17, 17' respectively and the brushes 16, 16', 17, 17' are electrically connected to the collector rings $a, b, i, j$, respectively and the coils 6, 7 are electrically interconnected and the coils 7, 8 are electrically interconnected.

Some of the collector rings $a$ to $k$ inclusive and $m$ may be variously interconnected and others may be variously connected in circuit with other electrical devices as will now be described.

The collector rings may either be connected to or themselves constitute some of the terminals or contact members of a controller shown diagrammatically at 61 in Figs. 7 to 20 inclusive, said controller having other terminals or contact members $n, o, p, q, r, s, t, u$, the contact members $n, s$ being electrically connected to the terminals respectively of a rheostat 62 and the contact members $t, u$ being electrically connected to the terminals respectively of a second rheostat 63 and the contact members $o, r$ being electrically connected to the respective terminals of a storage battery 64 and the contact members $p, q$ being electrically connected to the respective terminals of an underload circuit breaker 65.

The field coils 6, 8 surround a pole piece 66, the field coils 7, 9 surround a pole piece 67, the compensating coils 10, 12 surround a pole piece 68, and the compensating coils 11, 13 surround a pole piece 69.

Owing to the fact that the coils 10, 11, 12, 13 need be comparatively small, the field coils 6, 7, 8, 9 may extend along a comparatively great length of arc between the outer and inner rotors 1, 3 and consequently the pole pieces 66, 67 may also be extended along a comparatively great length of arc. The advantage of this is that the area of the pole faces is maximized, thus minimizing the required M. M. F. of the field and also minimizing the specific induction of the field in the air gaps and in the peripheral portion of the armature core. By minimizing the M. M. F., as is clear, the amount of copper requisite in the field coils is minimized as is also the space occupied by said coils.

The field coils 6, 7, 8, 9 and their pole pieces 66, 67 function for both armature rotors for producing a resultant magnetic field. The advantage of this, as is evident, is a further saving in the requisite amount of copper in the field coils and saving of space occupied by said coils, also minimizing the length of the magnetic lines and consequently the required M. M. F., and furthermore minimizing the losses due to hysteresis in the armature cores and to eddy currents in the armature windings.

Another advantage of the magnetic field being between the two concentric armatures is that thereby the amount of passive magnetic substance required for the magnetic field is minimized, thereby minimizing the weight of and space occupied by the electrical device.

In some instances the M. M. F. of one armature winding compensates the M. M. F. of the other armature winding so as to minimize distortion of the magnetic field and enable the use of air gaps of minimum size between the field and armature rotors.

Operation of the prime mover 44 will drive the outer armature 1 as in Figs. 1 and 4 or will drive the field rotor 2 as in Fig. 21 to generate current in said armature and the magnetic flux produced in said armature rotor will tend to rotate the field rotor 2 or outer armature rotor, as the case may be, in the same direction as said armature rotor or field rotor, and the magnetic flux produced in said field rotor will tend to rotate the inner armature rotor 3. It is clear that when all of the rotors are rotating at substantially like speeds the losses due to friction of the bearings, friction of the brushes, friction due to air resistance, waste current in coils during commutation, hysteresis in armature cores, eddy currents in the armature cores and pole pieces and armature conductors, will be at a minimum and much less than when one or two of the rotors are stationary, and advantage is taken of this fact to obtain maximum speed and power when said losses are at minimum and to obtain considerable braking effect when the electrical losses are greater than minimum.

In Fig. 1 means are shown to produce braking effect on the inner armature 3, said means including vehicle brakes 70 on the wheels 33 and also including the driving connections between said wheels and said armature rotor. The braking effect from the brakes 70 is transmitted through the shaft 32 and gears 30, 31 to the shaft 27, thence to the housing 21, thence to the shaft 39, thence to the field rotor 2. Since the rotation of the outer rotor 1 produces a magnetic flux in the rotor 2, it is obvious that the magnetic flux produced in the rotor 2 has its effect upon the rotor 3 and slowing down or stopping of the rotor 2 will therefore cause braking action upon and consequent slowing down of the armature rotor 3.

In the form of the invention in Figs. 1 and 4 the torque effect between the outer and intermediate rotors and between the intermediate and inner rotors is in series, or in other words, the relations are such that slip occurs between the outer and intermediate rotors to thereby produce lag or less speed of the intermediate rotor than of the outer rotor and that slip also occurs between the intermediate and inner rotors to thereby produce lag or less speed of the inner rotor than of the intermediate rotor.

This series lag or slip is due to the fact that the outer armature rotor is the member driven by the prime mover and slip therefore occurs in two instances.

In the form of the invention shown in Fig. 21 the torque effect between the intermediate and outer rotors and between the intermediate and inner rotors is in parallel due to the fact that the prime mover drives the intermediate rotor so that slip between the prime mover and inner armature occurs only in one instance. From this it is clear that in Fig. 21 the inner armature will rotate faster than in Figs. 1 and 4 at any given speed of the prime mover.

Figure 7:
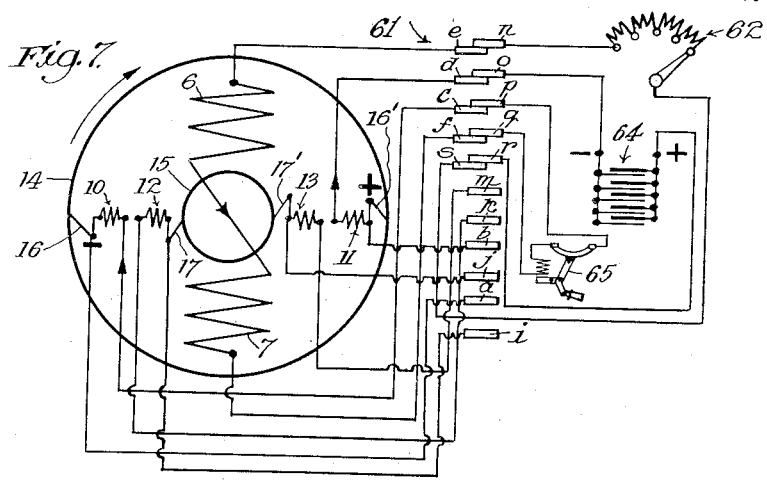
Fig. 7 is a diagram of electrical connections and circuits whereby the electrical transmission device functions as a motor to start the prime mover, the field rotor and the inner armature rotor being stationary and the other armature rotor turning.

In practice, assuming at the start, for example, that the prime mover 44 is stationary and the brakes 70, or the brake 37, 38, are on, if it be desired to start the prime mover, the controller 61 will be operated to close the contacts $e$, $n$ and $d$, $o$, and $c$, $p$, and $f$, $q$, and $s$, $r$, as in Fig. 7 and the circuit breaker 65 will be closed, whereupon electric current from the battery 64 will energize the field coils 6, 7 to produce magnetic flux to turn the outer armature rotor 1 as motor, thereby driving the prime mover to start it into operation in a manner well understood in the gas engine art.

The rotating armature produces a counter E. M. F. and thereby operates the circuit breaker 65 to disconnect the battery from the electrical transmission device. The magnetic flux of the coils 11 and 12 function to compensate portions of the magnetic field and thereby prevent turning of the neutral plane of the resultant field and prevent sparking at the brushes.

Figure 8:
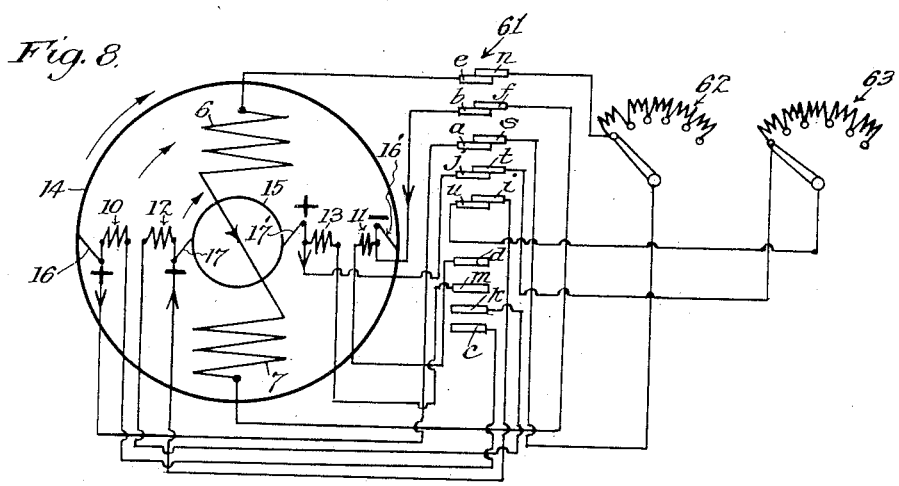
Fig. 8 is a diagram of electrical connections and circuits whereby maximum torque for any given speed of the prime mover is applied to turn the driven member, all of the rotors turning.

After the prime mover is in operation, the vehicle brakes 70 or the brake 37, 38, as the case may be, will be released and the controller 61 may be operated to close the contacts $e$, $n$ and $b$, $f$ and $a$, $s$, and $j$, $t$ and $u$, $i$ as in Fig. 8 to obtain high torque for starting the load. The outer armature rotor 1 generates electric current to energize the field coils 6, 7 and thereby produce turning of the inner armature rotor 3 as motor to drive the differential gear wheel 20, the field rotor as in Figs. 1 and 4 or outer armature rotor as in Fig. 21 also turning by reason of the magnetic flux of the outer armature rotor. Turning of the field rotor 2, as in Figs. 1 and 4, or outer armature rotor 1 as in Fig. 21, operates the gear wheel 35. The rheostat 62 is operated to cut in more or less resistance to regulate the strength of the field and the rheostat 63 is operated to oppose more or less resistance to the electric current flowing from the inner armature 3 in proportion to the amount of the load on the device and other conditions such as the grade of the surface on which the vehicle is running and the character of said surface.

Differences in speed between the field and inner armature rotors as in Figs. 1 and 4 and between the inner and outer rotors as in Fig. 21, are compensated by the differential gears 20, 21, 22, 35 which operate to drive the shaft 27 to turn the rear wheels 33 as in Figs. 1 and 4 and to also turn the front wheels 59 as in Fig. 4.

Figure 9:
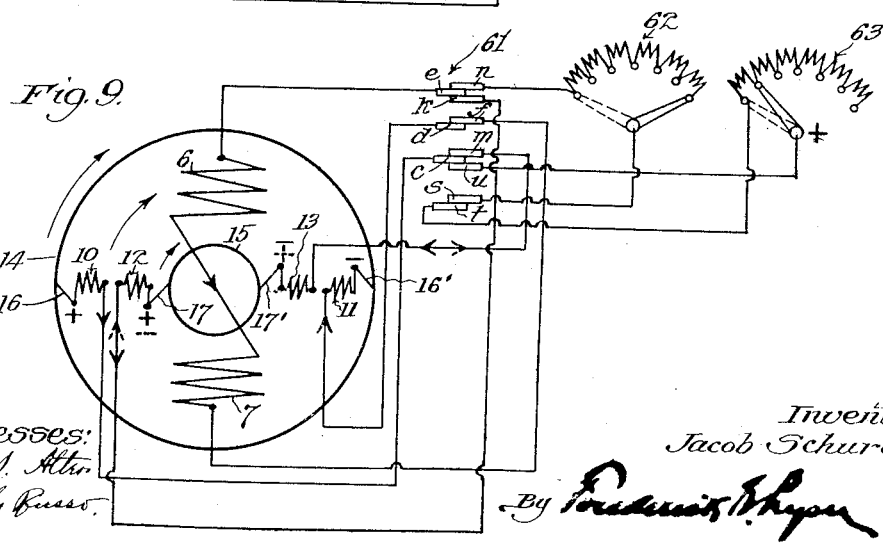
Fig. 9 is a diagram of electrical connections and circuits whereby regulation of the speed of the driven member is obtained, all of the rotors turning.

Speed regulation may be effected as in Fig. 9 by operating the controller 61 to close the contacts $e$, $n$, $k$ and $d$, $f$ and $c$, $m$, $u$ and $s$, $t$ to cause electric current generated in the outer armature rotor 1 to flow through the field coils 6, 7 to produce magnetic flux to turn the inner armature rotor 3. To produce the highest speed (approximately engine speed) of the driven member 27, the rheostats 62, 63 will be operated to cut out all of their resistance, and, to slow down, said rheostats will be operated to cut in more and more resistance, thus effecting slower and slower turning of the inner armature rotor 3. The slowing down of the armature rotor is due to the fact that the direction of current in the inner armature rotor is such as to cause counter rotation of said inner armature rotor relative to the field rotor. In consequence of this, to reverse, the brake 37, 38 will be applied to hold the field rotor as in Figs. 1 and 4 or outer rotor 1 as in Fig. 21 stationary and the inner armature rotor will then drive the shaft 27 backward.

The driven member 27 may be driven at approximately engine speed by also operating the controller 61 to close the contacts $e$, $i$, $n$ and $b$, $f$ and $a$, $j$, $u$ and $s$, $t$ as in Fig. 10. To cause higher speed (approximately engine speed) of the driven member 27, the rheostats 62, 63 will be adjusted to cut out all of their resistance, and slowing down is accomplished by cutting in more and more of said resistance at either or both of the rheostats.

By entirely interrupting the shunt current at the rheostats 62, 63, the current may be reversed through the inner armature rotor 3 to drive the inner armature rotor counter to the field rotor, thus slowing down said inner armature rotor. During this reversal the current will flow from the outer armature rotor 14, through the brush 16 to the contacts $a$, $j$, brush 17', inner rotor 15, brush 17, contacts $i$, $e$, field coils 6, 7, brushes $f$, $b$, and brush 16' to the outer rotor. From this it is clear that, to reverse with the contacts closed as stated for the form of the invention shown in Figs. 1 and 4, the brake 37, 38 will be applied to hold the field stationary, whereupon the inner armature rotor will drive the driven member backward instead of forward. In Fig. 21 the outer armature will be held stationary.

If it be desired to drive the driven member 27 at greater speed than the engine speed, the controller 61 will be adjusted to close the contacts $a$, $e$ and $b$, $j$ and $f$, $i$ as in Fig. 11. The magnetic flux of the outer armature rotor 1 acts as turning power on the field rotor 2 as in Figs. 1 and 4 and on itself as in Fig. 21, and the magnetic flux of the field rotor acts as turning power on the inner armature rotor.

The current generated in the outer armature 1 not only energizes the field but also energizes the inner armature winding 5 so as to produce electrical reaction between the inner armature rotor and the field rotor thus to drive said inner armature rotor at a higher rate of speed than the field rotor. The mean of the speeds of the rotors 2, 3 is transmitted by the gears 21, 22, 23, 35 to the shaft 27.

When greater speed and power of the driven member 27 is desired than can be produced by the prime mover, the brake 37, 38 will be set to hold the field rotor stationary as in Figs. 1 and 4 or outer rotor 1 stationary as in Fig. 21, and the controller 61 will be operated to close the contacts $a$, $e$ and $b$, $n$ and $i$, $k$ and $j$, $o$ and $r$, $s$ as in Fig. 12 so as to obtain the same effect as in Fig. 11 with the addition of increase of power due to the E. M. F of the storage battery 64 supplementing the E. M. F. generated in the electrical transmission device.

Figure 13:
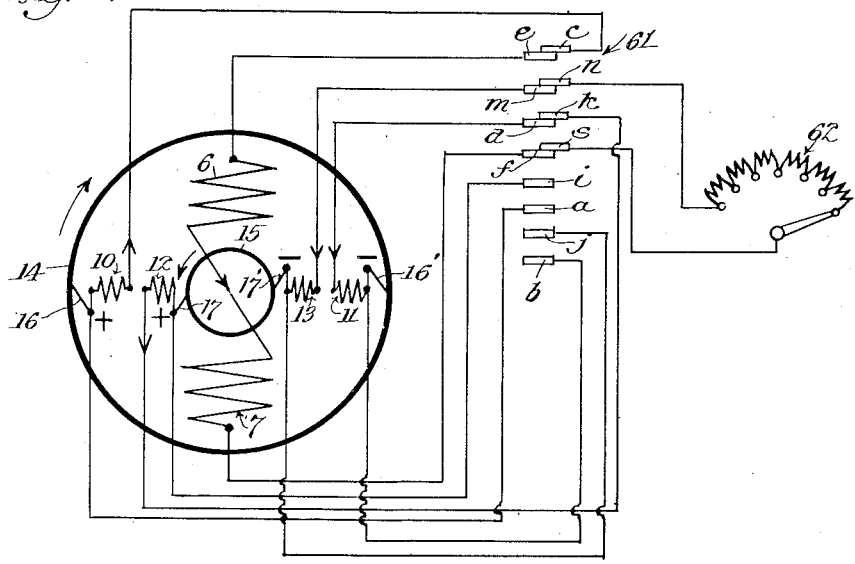
Fig. 13 is a diagram of electrical connections and circuits whereby reverse driving of the driven member may be obtained without reversing the prime mover and without using current from an external source, the field rotor being stationary and the armature rotors turning.

If it be desired to reverse the direction of rotation of the driven member 27 in Figs. 1 and 4, the brake 37, 38 will be set to hold the field stationary, and the controller will be operated to close the contacts $c$, $e$ and $m$, $n$ and $d$, $k$ and $f$, $s$ as in Fig. 13, whereupon electric current generated in the outer armature rotor 1 will be supplied to the inner armature rotor 3 in reverse direction to that in Figs. 7, 8, 10, 11, 12 to turn the inner armature rotor counter to the outer armature rotor. Reversal of the inner rotor 3 is also obtained as in Fig. 14 by setting the brake 37, 38 to hold the field rotor stationary and by operating the controller 61 to close the contacts $e$, $n$ and $k$, $o$ and $f$, $m$ and $r$, $s$ to energize the field coils 6, 7 and inner armature winding 5 by current from the battery 64, the inner armature rotor operating as motor.

Figure 15:
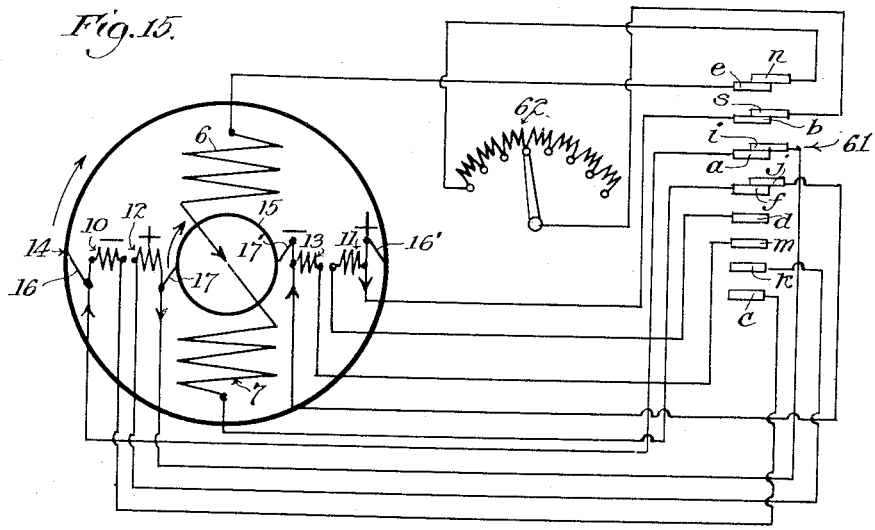
Fig. 15 is a diagram of electrical connections and circuits to permit of coasting, the field rotor being stationary and the inner rotor turning as generator and driving the outer rotor as motor.

If it be desired to obtain braking action, the brake 37, 38 will be set to hold the field rotor 2 stationary as in Figs. 1 and 4 or to hold the outer armature rotor stationary as in Fig. 21, and the controller 61 will be operated to close the contacts $e$, $n$ and $b$, $s$ and $a$, $i$ and $f$, $j$ as in Fig. 15 to generate current in the inner armature rotor 3. The current acts to drive the outer armature rotor 1 as motor to drive the engine 44 against the resistance produced by compression in the engine. Thus braking action of the engine is obtained and further braking action is produced by the various losses in the electrical transmission device. To decrease the brake effect of the losses in the device the brake 37, 38 will be released.

In Fig. 15 both armature windings 4, 5 are in series with the field coils.

Figure 16:
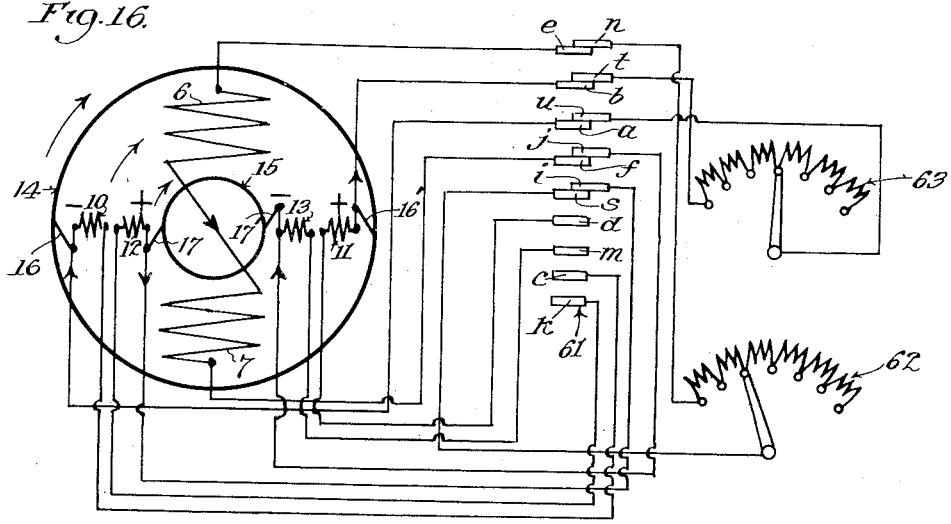
Fig. 16 is a diagram of electrical connections and circuits to permit of coasting, all of the rotors turning and the prime mover producing a braking effect.

To obtain braking action of less power than with the brake set and connections in Fig. 15, the brake 37, 38 will be released so as to diminish the brake effect of the losses in the device, and the controller 61 will be operated to close the contacts $e$, $n$ and $b$, $t$ and $a$, $u$ and $f$, $j$ and $i$, $s$ as in Fig. 16.

In Fig. 16 the inner armature winding 5 is in series with the field coils and rheostat 62, and the outer armature winding 4 is only in series with the rheostat 63, the advantage of this being a wide range of braking effect. When it is desired to recharge the battery 64, the brake 37, 38 will be set to hold the field rotor 2 stationary, as in Figs. 1 and 4 or to hold the outer armature rotor 1 stationary as in Fig. 21, and the controller 61 will be operated to close the contacts $c$, $e$, $o$ and $d$, $n$, $r$ and $f$, $s$ as in Fig. 17 to generate electric current in the outer armature rotor.

A very desirable way of regulating the speed of the driven member 27 is shown in Fig. 18 and to obtain said regulation the controller 61 will be operated to close the contacts $c$, $e$ and $d$, $n$ and $m$, $t$ and $f$, $s$ and $g$, $k$ and $h$, $u$. The signs of the M. M. F. of the field coils 6, 7 are different from the signs of the M. M. F. of the field coils 8, 9 and consequently the resultant M. M. F. is the algebraic sum of the M. M. F. of the field coils, said algebraic sum being an arithmetic difference. The algebraic sum of the M. M. Fs'. is increased and diminished by cutting out and in resistance at either or both of the rheostats 62, 63.

To obtain speed regulation in another way, the controller 61 will be operated to close the contacts $c$, $e$ and $k$, $t$ and $m$, $g$ and $d$, $n$ and $f$, $s$ and $h$, $u$ as in Fig. 19, the algebraic sum of the M. M. Fs'. of the coils 6, 7, 8, 9 in this instance being an arithmetic sum. The algebraic sum is increased and diminished as just described for Fig. 18.

From the foregoing it is seen that in Figs. 18 and 19 the tension of the current can be regulated by adjusting either or both of the rheostats 62, 63 and this is of value, for instance, in recharging the battery.

If the brake 37, 38 is set as described above in connection with Fig. 13 and the driven member 27 is running reversely, said driven member may be driven ahead without releasing the brake, and to effect this the controller will be operated to close the contacts $a$, $c$, $e$ and $f$, $s$ and $b$, $j$ and $i$, $n$ as in Fig. 20, thus reversing the direction of the current in the inner armature rotor to reverse said rotor and driven member 27.

Figure 14:
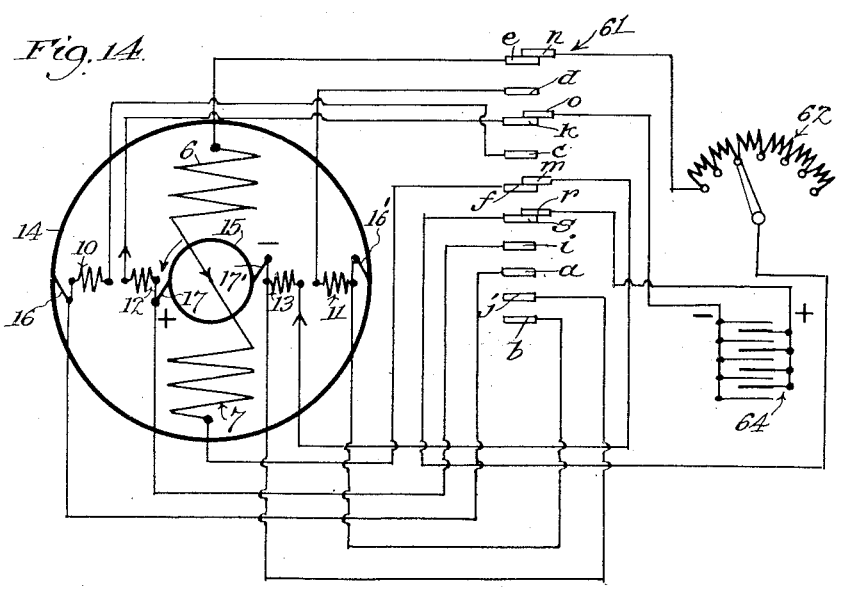
Fig. 14 is a diagram of electrical connections and circuits whereby reverse driving of the driven member may be obtained with current from an external source, the field and other armature rotors being stationary and the other rotor turning.
Figure 17:
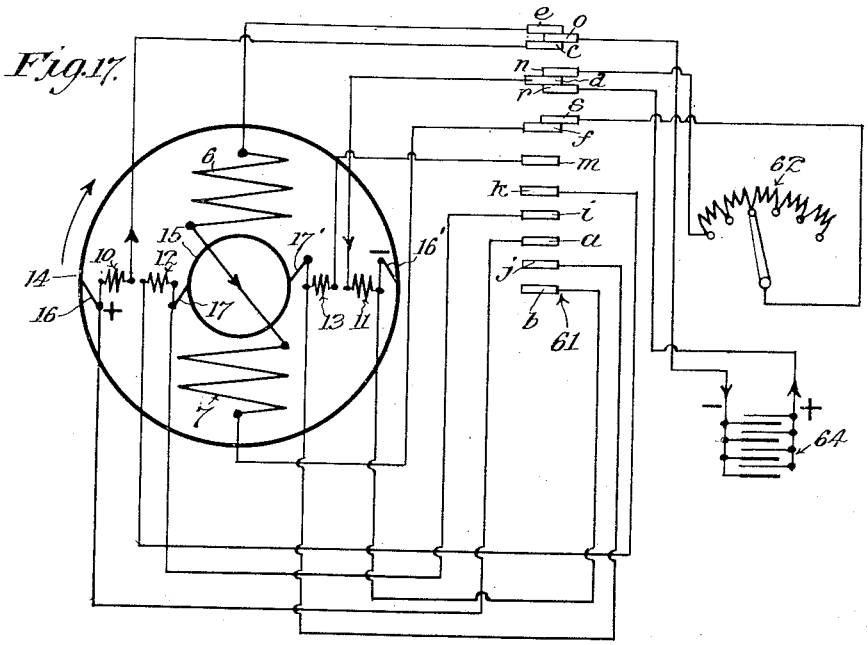
Fig. 17 is a diagram of electrical connections and circuits whereby the electrical transmission device functions as a generator to charge the battery in minimum time, the field rotor and inner armature rotor being stationary and the other rotor turning.

It is noted that in Figs. 7, 17, 18 the compensating coils 10, 11 function to compensate portions of the magnetic field and thereby prevent turning of the neutral plane of the resultant field to prevent sparking at the brushes and that in Fig. 14 the compensating coils 12, 13 function to prevent sparking at the brushes, and furthermore that in Figs. 9, 13, 18, 19 the compensating coils 10, 11, 12, 13 all function to prevent sparking at the brushes.

In relatively small aggregates the losses due to friction of the brushes against the collector rings $a$, $b$, $i$, $j$, may be greater than the losses due to ohmic resistance in the coils 10, 11, 12, 13 and consequently it may be advisable to omit said collector rings and make suitable connections at the controller 61 to cut in the coils 10, 11, 12, 13 in series with the brushes 16, 16', 17, 17'; for instance in Figs. 8, 10, 11, 12, 15, 16, 20 the controller will be operated to cause the contacts or rings $c$, $d$, $k$, $m$ to be substituted for the contacts or rings $a$, $b$, $i$ and $j$. The coils 10, 11, 12, 13 may thus all be energized without distorting the resultant magnetic field for the reason that the direction of the current in the coils 10, 11 is counter to that in the coils 12, 13 and therefore said coils nullify one another.

It is understood that the field coils 6, 7, 8, 9 may be compounded in Figs. 9, 10, 16 as in Figs. 18, 19 by making suitable connections at the controller as is readily understood by the foregoing description in connection with Figs. 18, 19.

With the connections shown in Fig. 20, maximum available torque is produced, said torque being greater than the torque delivered by the engine shaft.

As clearly shown in Fig. 22, the field core is formed of spaced apart outwardly and inwardly expanding sections 71 which may be solid or laminated as desired and which form between them relatively narrow radial slots 72, 73 at the outer and inner margins of the rotor and relatively wider radial slots 74 communicating with the slots 72, 73. The field coils may be disposed within some of the slots 74 as in the drawings, or if desired said coils may be distributed in all of said slots, as is readily understood.

This construction of the field core just described is of advantage to reduce eddy current losses in the field rotor and also to minimize armature reactions in the resultant magnetic field.

I claim:

1. A prime mover, concentric rotors having windings, one of said rotors being connected to the prime mover, and a driven member connected to two other of said rotors, one of said rotors constituting a common field for the other rotors.

2. A prime mover, concentric rotors having windings, one of said rotors being connected to the prime mover, a driven member, and differential gearing connected to the driven member and to other of said rotors, one of said rotors constituting a common field for the other rotors.

3. Concentric rotors provided with windings respectively, differential gearing having one of its elements connected to one of said rotors and another of its elements to a second one of said rotors, and means to drive a third one of said rotors, one of said rotors constituting a common field for the other rotors.

4. Concentric outer and inner and intermediate rotors provided with windings respectively, differential gearing having one of its elements connected to the inner rotor and another of its elements to the intermediate rotor, and means to drive the outer rotor, one of said rotors constituting a common field for the other rotors.

5. Concentric rotors provided with windings respectively, differential gearing having one of its elements connected to one of said rotors and having another of its elements connected to a second one of said rotors, breaking means for one of said differentially connected rotors, and means to drive a third one of said rotors.

6. Concentric outer and inner and intermediate rotors provided with windings respectively, differential gearing having one of its elements connected to the inner rotor and another of its elements to the intermediate rotor, braking means for the intermediate rotor, and means to drive the outer rotor.

7. Concentric armatures, a pole piece intermediate of said armatures, and coils for said pole piece, means to cause the sign of the M. M. F. of one of said coils to be different from the sign of the M. M. F. of another of said coils to weaken the resultant magnetic field, said means being operative to cause the signs of the M. M. F. of said coils to be the same as one another to strengthen the resultant magnetic field, and means to increase and diminish the algebraic sum of the M. M. F. of the coils.

8. Concentric armatures, pole pieces intermediate of said armatures, a field coil for one of said pole pieces, compensating coils for another of said pole pieces, and means to cause electric current to flow in one of said compensating coils counter to the electric current in another of said compensating coils so that said compensating coils will nullify one another.

9. Concentric armatures, pole pieces intermediate of said armatures, a field coil for one of said pole pieces, compensating coils for another of said pole pieces, and means to cause the M. M. F. produced by the current in one of the compensating coils to compensate a portion of the field of one armature and to cause the M. M. F. produced by the current in another of said compensating coils to compensate a portion of the field of the other armature.

10. Rotative outer and inner concentric rotative armatures, a field core rotatively mounted between said armatures, a coil for said field core, commutators for the armatures respectively, brushes rotative with the field core and engaging the commutators respectively, and collector rings rotative with said field core.

11. Differential gearing, rotors having windings respectively, one of said rotors being connected to one element of the gearing and another of said rotors being connected to a second element of said gearing, a prime mover to drive a third one of said rotors, and a driven member connected to a third element of said gearing.

12. A rotative armature, a field core concentric with said armature having a coil, a second rotative armature concentric with the first armature and field core, and a controller adapted to connect the field coil in series with the first named armature and to connect the second armature in closed circuit on itself.

13. An armature, a field core concentric with said armature having a coil, a second armature concentric with the first armature, and a controller to connect the field coil in series with the first armature and to connect the second armature in series with the field coil and first armature.

14. An armature, a field core concentric with said armature having a coil, a second armature concentric with the first armature, a rheostat, and a controller adapted to connect the field coil and armatures in series and to connect the rheostat in shunt with the armatures.

15. An armature, a field core concentric with said armature having a coil, a second armature concentric with the first armature and field core, and a controller adapted to connect the field coil in series with the first armature and to connect the second armature in series with the first armature and field coil.

16. An armature, a field core concentric with said armature having a coil, a rheostat, a second armature concentric with the first armature and field core, and a controller adapted to connect the field coil and rheostat and armature in series and to connect the positive pole of one armature to the negative pole of the other armature.

17. Concentric armatures, field cores, coils for said field cores respectively, the sign of said field coils being different, a rheostat, and a controller adapted to connect the field coils in series with the respective armatures and to connect the rheostat in series with one of said armatures and its field coil.

18. Concentric armatures, field cores, coils for said field cores respectively, the signs of said field coils being alike, a rheostat, and a controller adapted to connect the field coils in series with the respective armatures and to connect the rheostat in series with one of said armatures and its field coil.

19. An armature, a rotative core having a coil designed to have its magnetic lines cut at one side by the armature winding, other rotative winding at the other side of the rotor to produce counter M. M. F., and means to produce relative movement between said armature and core.

Signed at Los Angeles, California, this 7th day of January, 1916.

JACOB SCHURCH.

Witnesses:
GEORGE H. HILES,
ANNA F. SCHMIDTBAUER.